(12) United States Patent
Claussen et al.

(10) Patent No.: US 11,321,646 B2
(45) Date of Patent: May 3, 2022

(54) TRANSPARENT SCALABLE ACCESS TO ACTIVE AND COMPLETED PROCESS AND TASK INFORMATION

(71) Applicant: INTERNATIONAL BUSINESS MACHINES CORPORATION, Armonk, NY (US)

(72) Inventors: Ryan T. Claussen, Rochester, MN (US); Eric N. Herness, Byron, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1525 days.

(21) Appl. No.: 15/208,685

(22) Filed: Jul. 13, 2016

(65) Prior Publication Data

US 2018/0018609 A1    Jan. 18, 2018

(51) Int. Cl.
*G06F 7/00*      (2006.01)
*G06Q 10/06*     (2012.01)

(52) U.S. Cl.
CPC ......... *G06Q 10/063114* (2013.01); *G06Q 10/06313* (2013.01)

(58) Field of Classification Search
CPC ........... G06Q 10/063114; G06Q 10/06313
See application file for complete search history.

(56) References Cited

U.S. PATENT DOCUMENTS

| | | | |
|---|---|---|---|
| 8,082,322 B1 | 12/2011 | Pascarella et al. | |
| 8,429,716 B2 | 4/2013 | Earl et al. | |
| 8,443,367 B1 | 5/2013 | Taylor et al. | |
| 8,799,181 B2 | 8/2014 | Moore | |
| 8,812,544 B2 | 8/2014 | Engelhardt et al. | |
| 8,825,713 B2 | 9/2014 | Guizar | |
| 9,015,812 B2 | 4/2015 | Plattner et al. | |

(Continued)

OTHER PUBLICATIONS

Diniz et al., "Managing Access to Service Providers in Federated Identity Environments: A Case Study in a Cloud Storage Service", 2015 XXXIII Symposium on Cumputer Networks and Distributed Systems, 10 pages.

(Continued)

*Primary Examiner* — Isaac M Woo
(74) *Attorney, Agent, or Firm* — Brian Restauro; Matthew M. Hulihan; Heslin Rothenberg Farley & Mesiti PC (57) ABSTRACT

Transparent scalable access to active and completed process and task information. An embodiment includes receiving requests for active process instance information and completed process instance information, maintaining an active process manager database and secondary process manager database(s) in a process management environment, with the active process manager database supporting newly created process instances and including information about active process instances, and the secondary process manager database(s) including information about completed process instances, and responding to the requests, the responding including accessing an appropriate process manager database of the active process manager database and the secondary process manager database(s) to obtain information for responding to a request, and responding to the request with the obtained information.

8 Claims, 7 Drawing Sheets

(56) References Cited

U.S. PATENT DOCUMENTS

| | | |
|---|---|---|
| 9,148,404 B2 | 9/2015 | Chuang et al. |
| 2012/0158699 A1 | 6/2012 | Creel |
| 2014/0157370 A1* | 6/2014 | Plattner ............... G06F 21/6245 726/4 |
| 2014/0214896 A1* | 7/2014 | Hotta .................. G06F 11/3495 707/770 |
| 2015/0106142 A1 | 4/2015 | Ristock et al. |
| 2015/0120822 A1 | 4/2015 | Li |
| 2015/0150012 A1* | 5/2015 | Shazly .................. G06F 9/5083 718/102 |
| 2015/0213393 A1* | 7/2015 | O'Neill .......... G06Q 10/063114 705/7.14 |
| 2015/0264180 A1* | 9/2015 | Wolthuis ............ G06Q 10/0633 379/265.12 |

OTHER PUBLICATIONS

Herness et al., "BTB-2890: Understanding the IBM BPM Process Federation Server", Feb. 21-25, InterConnect 2016—The Premier Cloud & Mobile Conference, 45 pages.

IBM Knowledge Center, "Getting Started with Process Federation Server", https://www.ibm.com/support/knowledgecenter/SS964W/com.ibm.wbpm.main.doc/topics/cbpm_fps.html (last accessed Jul. 6, 2016), 1 page.

IBM Knowledge Center, "The Process Federation Server REST APIs", https://www.ibm.com/support/knowledgecenter/SS964W/com.ibm.wbpm.main.doc/topics/cfps_restapis.html (last accessed Jul. 6, 2016), 4 pages.

\* cited by examiner

TRANSPARENT SCALABLE ACCESS TO ACTIVE AND COMPLETED PROCESS AND TASK INFORMATION

BACKGROUND

It is desirable for business users who participate in and manage business processes to have visibility to active process instances and the tasks within those process instances, especially those tasks that are assigned for manual performance. Also desired is visibility to information about completed process instances and their associated task histories. A process is also known as a workflow. A task in the context of a process is an assigned work item, either manual (human-performed) or automated (system-performed). Typically, several tasks make up a process instance, i.e. an instantiation of a process. Computer processes that execute on one or more servers support progress and tracking of a business process/workflow.

SUMMARY

Shortcomings of the prior art are overcome and additional advantages are provided through the provision of a computer-implemented method that includes receiving requests for active process instance information and completed process instance information. The method also includes maintaining an active process manager database and at least one secondary process manager database in a process management environment. The active process manager database supports newly created process instances and includes information about active process instances, and the at least one secondary process manager database includes information about completed process instances. The method also includes responding to the requests. The responding includes accessing an appropriate process manager database of the active process manager database and the at least one secondary process manager database to obtain information for responding to a request, and responding to the request with the obtained information.

Further, a computer program product including a computer readable storage medium readable by a processor and storing instructions for execution by the processor is provided for performing a method that includes: receiving requests for active process instance information and completed process instance information. The method also includes maintaining an active process manager database and at least one secondary process manager database in a process management environment. The active process manager database supports newly created process instances and includes information about active process instances, and the at least one secondary process manager database includes information about completed process instances. The method also includes responding to the requests. The responding includes accessing an appropriate process manager database of the active process manager database and the at least one secondary process manager database to obtain information for responding to a request, and responding to the request with the obtained information.

Yet further, a computer system is provided that includes a memory and a processor in communications with the memory, wherein the computer system is configured to perform a method including: receiving requests for active process instance information and completed process instance information. The method also includes maintaining an active process manager database and at least one secondary process manager database in a process management environment. The active process manager database supports newly created process instances and includes information about active process instances, and the at least one secondary process manager database includes information about completed process instances. The method also includes responding to the requests. The responding includes accessing an appropriate process manager database of the active process manager database and the at least one secondary process manager database to obtain information for responding to a request, and responding to the request with the obtained information.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Business process participants and managers may desire a holistic view of both active and completed processes, e.g. a total set of process and associated task history. Reports and insights can be gained by querying against this combination of active and historical data. Data analysis tools can be applied to this data irrespective of whether or not the data involves active process instances or historical process instances.

Meanwhile, information technology scaling and requirements demand special data retention policies. Good systems hygiene and management in a business process management environment, for example, generally encourages the maintenance of a primary (or "active") process/task database. The information technology team often wants instances (processes and tasks) deleted upon process instance completion to ensure maximum performance and scaling for the active workload. However, there is a competing desire to retain completed process and task information for later review, analysis, or other purposes, thus presenting a challenge regarding the retention of data.

Aspects described herein apply a federation concept to a time dimension with respect to information about process instances. This allows maintenance of information about completed process instances (including the associated task history) for a given retention period, allowing analysis of completed and active process instances and associated tasks in order to, as one example, gain additional insight regarding the processes.

An example business process management offering is Business Process Manager offered by International Business Machines Corporation, Armonk, N.Y., U.S.A. Business Process Manager incorporates the concept of a process federation server—providing transparent access to process instances and associated tasks, even if those tasks may be (i) running in different environments or cells (meaning tasks and processes in separate databases), (ii) running on different versions of the Business Process Manager software, and/or (iii) running different business process management languages, such as Business Process Execution Language (BPEL) or Business Process Model and Notation (BPMN).

The Process Federation Server (PFS) portion of the Business Process Manager offering by International Business Machines Corporation enables federation of disparate tasks lists into a single list that end-users can query for their tasks. However, the data in the federation server may be ephemeral. For example, as soon as a task is deleted from the BPM runtime, it may be removed from the federation server.

Described herein are facilities to address the competing desires of information retention and maintenance. Aspects can include:

1) archiving or copying existing process information from an active business process management (BPM) process database into a secondary process manager database once the process information is no longer needed by active instance(s), thus removing the information from the scope of the active BPM runtime. When a process instance completes, its tasks are complete, and any associated information is no longer needed in terms of facilitating other active process instances, the associated data may be placed into a secondary process manager database. A history remains of what occurred while the process instance was running, serving as a record of information while the process instance was active.

2) Using a federation layer provided by a federation server that client systems leverage to request process instance information. The federation layer joins the active BPM runtime data with the archived historical data (information about completed process instances) in the secondary database(s). The clients may be unaware of the members of the federation and the fact that process instance information may be sourced from disparate backends.

3) Providing a common application programming interface (API) giving users, with no change of API code, access to both the historical data and active data at any time. This arrangement hides the fact that there may be one or possibly several secondary archive process manager databases along with the active BPM database providing current and historical data, respectively. The common API may be packaged as part of the federation server along with the federation layer, but other arrangements are possible. For instance, the API may be hosted outside of the federation server or other component of the process management environment, for instance a client demilitarized zone (DMZ), if desired.

A massively scaling archive of process instance data is provided without detrimentally impacting performance of process instances using the active BPM database due to the nature of how a BPM system (e.g. BPM server instance) operates. If a BPM system's process engine inserts rows into a database table as process instances are created and performs a database table scan as part of process execution, then overall process execution performance may degrade over time as the process table grows in size (more rows in the table leads to slower execution). By removing the completed instance data from this "active" process manager database and into one or more secondary process manager database(s) while providing an abstraction layer (process federation), the BPM engine servicing the active workloads can perform at peak speed while access to the information about completed process instances in the secondary database(s) remains available to the federation server and accessible through the API.

This approach reduces lookup time by moving information about completed process instances, which includes the associated task history for those instances, out of the runtime (active) database to provide a performance boost in the process engine which maintains states of processes. The process engine continues to use an active database and runs faster because the information about the completed process instances has been moved to secondary database(s). Meanwhile, the API uses the federation facilities for access to information about both the running instances and the historical instances, i.e. to look at requested process instance information regardless of which database (active or secondary) stores the information. The API can call a different entity to look up data about a completed process instance in a secondary process manager database, for instance.

Further details are now provided with regard to a process management environment. Initially, each BPM deployment environment may be registered with a process federation server. Multiple BPM server instances may run co-located together but with a different set of BPM applications. A client-side application, such as one to access process and task information, uses an API that works against the federation server. The API may be hosted on the federation servers in some embodiments. The client application can submit queries/requests through the API to the federation server. A query/request may actually be a complex query/request, such as one containing a wildcard or otherwise leading to a collection of data requests to be generated and provided to one or more server instances and associated databases for obtaining data therefrom.

Figure 1:
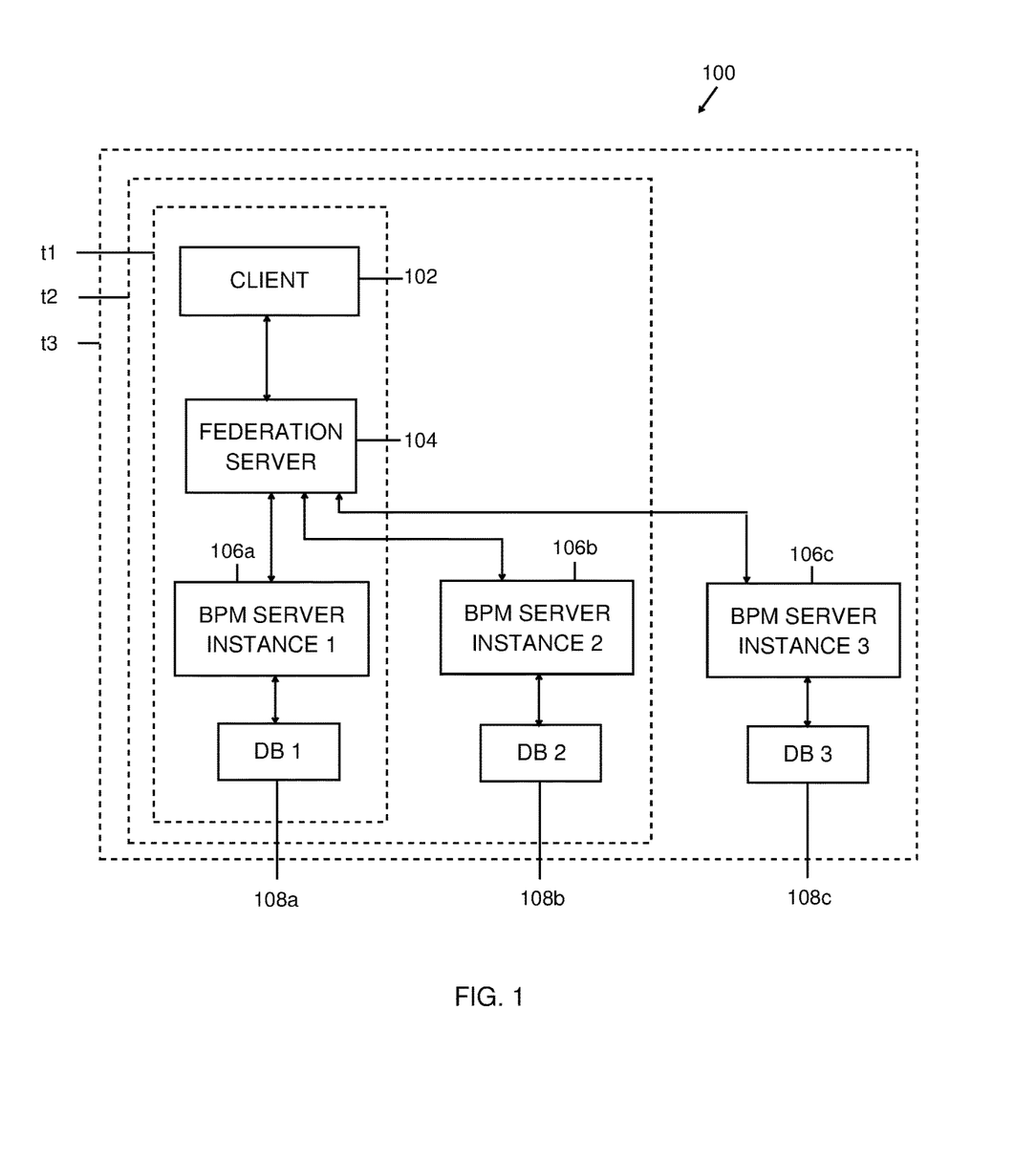
FIG. 1 depicts one example of a process management environment to incorporate and use aspects described herein.

FIG. 1 depicts one example of a process management environment to incorporate and use aspects described herein. Process management environment 100 includes a client system 102 that runs an application to make requests, in the form of queries for instance, for active process instance information and completed process instance information, i.e. information about active process instance(s) and information about completed process instance(s). Some requests may query only information about one or more active process instances or completed process instances, while some requests may query information about both active and completed process instance(s). The requests are made through an API (not pictured) to a federation server 104 running a federation layer with functionality described herein.

Initially, the federation server 104 is in communication with a first business process manager server instance 106*a* (BPM server instance 1), which includes a process engine for managing active process instances and is in communication with first database 108*a* (DB 1). The delineation of t1 represents the environment during a first timeframe, t1. During time t1, DB 1 holds information about active process instances as well as information about historical (completed) process instance(s), to the extent any process instances have completed.

As the system adds new process instances and completes process instances, and in accordance with aspects described herein, a second process manager server instance 106b (BPM server instance 2) is added. The second server instance 106b is in communication with an added second database 108b (DB 2). The environment after adding a second server instance and database is delineated t2 for a second timeframe. In some examples, second server instance 106b may be a clone of BPM service instance 1 in terms of its capabilities.

BPM server instance 2 and associated DB 2 may be utilized in different ways depending on the configuration of the environment. Two approaches are explained in further detail below. In one approach, the servicing of requests for information about completed process instances is migrated from the active server instance (BPM server instance 1) to the added server instance (BPM server instance 1) and associated DB 2. Consequently, the completed process instance information that resides in DB 1 is migrated over to DB 2, and requests for such information will be directed from the federation server to BPM server instance 2. In another approach, the added server instance (BPM server instance 2) is transitioned to handle the active process instances, while the initial instance (BPM server instance 1) becomes a secondary instance for handling requests for completed process instance information. Both approaches are described further below.

Again at some later time, t3, the environment includes an added third process manager server instance 106c (BPM server instance 3) in communication with a third database 108c (DB 3). The added server instance may be added for historical process instance information or may become the active server instance to handle newly created process instances.

The federation server can direct requests for active process instance information or completed process instance information to an appropriate process manager database housing the requested information, i.e. the active process manager database or a secondary process manager database as the case may be. Each server instance may have a process engine that handles API requests for data. The API and/or federation server can maintain a table or structure(s) that identifies the appropriate backend (server instance and/or database) to handle a request or portion thereof, based on which process instance is the subject of the request or portion of the request. In some examples, elastic search data on the federation server knows an origin member of the federation for any given process instance, and this is used to identify which backend instance is the appropriate one to handle the request, e.g. retrieve and return the data to the federation server.

Accordingly, one approach to provide transparent scalable access to process and task history is as follows. Based on reaching some threshold, such as passage of a period of time, or after creation or completion of a threshold number of process instances, it is determined to migrate information about completed process instances to a secondary process manager database.

Initially, if there is no secondary process manager database in the environment, for instance only a single server instance exists (as in t1 of FIG. 1), then a new clone instance including another database—business process manager database (BPMDB) or Business Process Choreographer database (BPEDB)—is made. The new database serves as a secondary process manager database for completed process instance information. In some examples, a new BPM server instance is created and federated into the federation, then the processes (workflows that can be instantiated as process instances) may be installed. Process and other data related to completed process instances can then be moved into the new database.

If instead one or more secondary process manager databases already exist, it can be determined whether an existing secondary process manager database has capacity to handle the completed process instances (based on the number of completed process instances to migrate, or the size of the associated information, for instance) to be moved from the active process manager database. If not, another secondary process manager database may be added. Alternatively, completed process instance information may be copied to the existing secondary process manager database until it has reached its capacity, at which point another clone may be created and populated with the remaining completed process information.

Information about completed processes instances older than the time threshold or the oldest instances that exceed the active database's retention number is copied onto one or more secondary databases and the completed instances are removed from the primary database.

To illustrate with reference to FIG. 1, if the threshold is reached in a situation delineated time t1, then server instance 106b and database 108b are created or at least added to the federation. Completed process instance information is deleted from active process manager database 108a (and from server instance 106a to the extent it maintains that information). That information, if not already existing in the secondary database 108b and/or server instance 106b—e.g. if not already copied when the instance and database were created—is copied to server instance 106b/database 108b. In this manner, the data related to the status of the completed process instances to be migrated and any other associated data (such as task information) is deleted but copied to BPM service instance 2 and/or associated DB2. Thus, at time 2 in this approach, DB 1 holds information about active process instances and DB2 holds information about completed process instances. At some later time when a threshold is reached, for instance ten-thousand new process instances have been created in the active process manager database, the method can copy a next wave of completed process instance information to fill DB 2 and/or add server instance 106c and associated database 108c and copy completed process instance information thereto.

Indexes used by the federation server 104 can be built up either automatically or by user action so that the federation server maintains an indication of where active and completed process instance information for various process instances is housed on the backend.

Figure 2A:
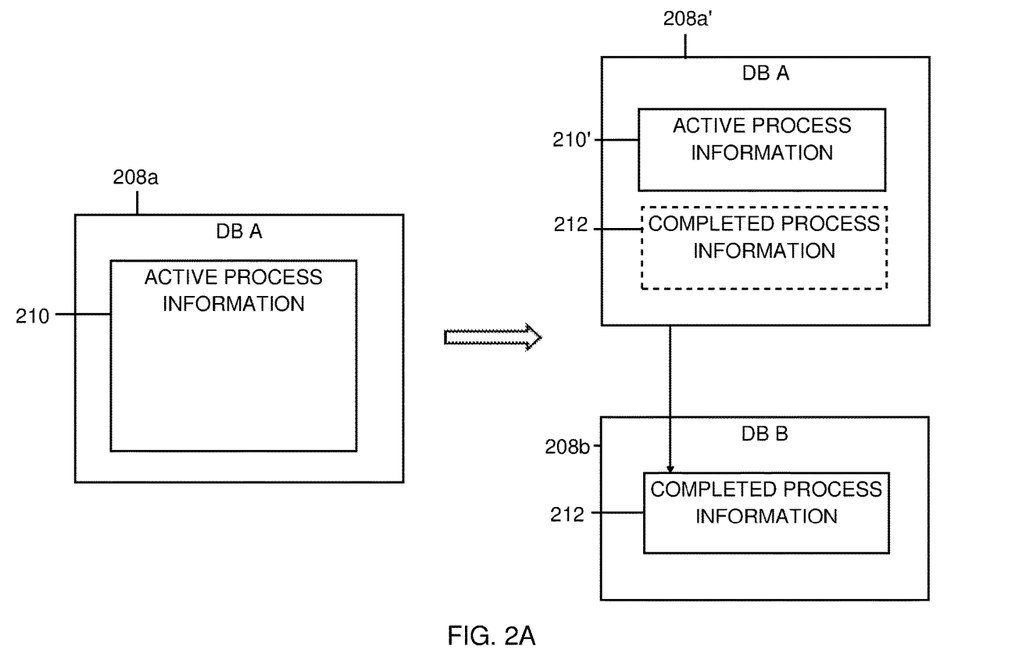
FIG. 2A depicts one example of adding a new process manager database to a process management environment to become a secondary process manager database, in accordance with aspects described herein.

In the above approach, a new process manager database is added to become a secondary process manager database. FIG. 2A depicts one such example of adding a new process manager database to a process management environment to become a secondary process manager database, in accordance with aspects described herein. Initially, as illustrated on the left side of FIG. 2A, DB A 208a includes active process information 210, such as information about active process instances and associated tasks. Based on meeting a threshold, the process migrates at least some completed process information to a newly added database, as depicted on the right side of FIG. 2A. Based on the threshold, the active process information 210 is partitioned into active process information 210' (for process instances that are not yet completed or that are otherwise not included in the completed processes being migrated) and completed process information 212 in DB A 208a'. The completed process information need not include information about all completed process instances on DB A, though in some examples it does. DB B 208b is the added secondary process manager database that in some examples is associated with a different BPM server instance, as illustrated in FIG. 1. The completed process information 212 is migrated to DB B 208b as shown, and deleted from DB A.

In another approach, the database to handle newly created process instances is changed from an initial active process manager database to an added process manager database. In this case, no copying of completed process instance information is required. It is noted that the federation server may continue to source active instance information from the initial active process manager database when information about active process instances being handled by the initial active database is requested. In other words, when the shift occurs in the process manager database that serves as the active process manager database, i.e. a shift from a first database to a second database, potentially some active process instances will continue to execute on the server instance associated with the first database, the active process manager database just before the shift occurs. Meanwhile, the added process manager database, the second database, serves as the new active process manager database for creation of new process instances, and for handling requests for information about any such new process instances. Thus, the federation server may be sourcing active process information from two or more different databases during the period in which there are active process instances spread across those databases. Eventually, the process instances handled by a prior-active process manager database—the first database—will complete, in which case the database will house only completed process instance information. The database during this timeframe may be regarded as a secondary process manager database because it does not support newly created process instances, which instead are supported by the then-current active process manager database. This approach reduces data movement and re-indexing of workload, in comparison to the above approach.

The identification of the proper process manager database to handle different requests for information about different process instances is, as above, done transparently via the API that is used by clients.

In some examples, there is an indicator or other type of information that serves as a toggle switch in the federation, the toggle switch controlling where new 'creates' (creation of a process instance) are to happen. The toggle dictates which database is the active process manager database for newly created process instances.

Referring to FIG. 1 in the context of this approach, initially at time t1, DB 1 108a is the active process manager database holding information about active and completed process instances. After reaching some threshold, then server instance 106b and database 108b are created or at least added to the federation and the federation server toggles the active process manager database to be DB 2. Any new process instances are supported by server instance 2 and information about those instances is stored in DB 2. Meanwhile, DB 1 includes information about completed processes and processes that were active at the time of the transition, even though DB 1 is no longer the active process manager database. At time t3, after reaching a threshold, yet another BPM server instance 3 and associated DB 3 are added to the federation and DB 3 becomes the active process manager database. DB 1 will likely include information about only completed process instances, assuming all processes supported by the database have completed, while DB 2 will likely hold some active and some completed process instance information. The federation server may source requested information from the appropriate database, and this may be transparent to the client system that presents the query to the federation server via the API.

Figure 2B:
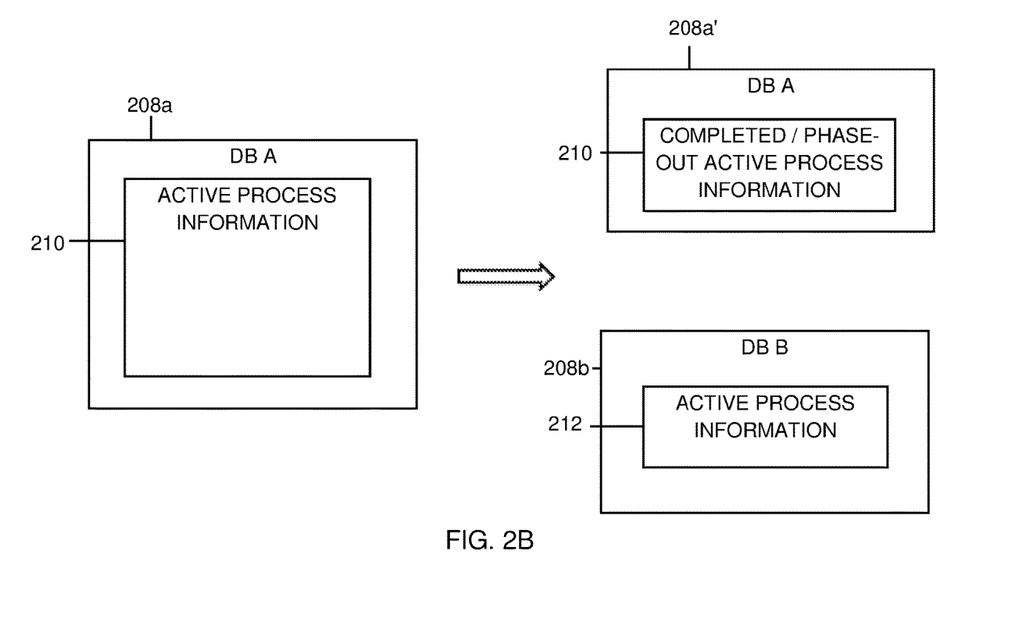
FIG. 2B depicts one example of adding a new process manager database to a process management environment to become an active process manager database, in accordance with aspects described herein.

FIG. 2B depicts one example of adding a new process manager database to a process management environment to become the active process manager database, in accordance with aspects described herein. Initially, as illustrated on the left side of FIG. 2B, DB A 208a includes active process information 210, such as information about active process instances and associated tasks. Based on meeting a threshold, the process makes DB B 208b the active process manager database, which will store active process information 212. Meanwhile, DB A 208a (represented as 208a' after the transition) takes on a role as secondary process manager database 210. It stores information about completed process instance as well as information about active process instances that were being supported by DB A prior to the transition and have not yet completed. This latter information is referred to as phase-out active process information in FIG. 2B, because it will eventually, as the active processes supported by DB A complete, be completed process instance information.

Additional logic may be incorporated to define and handle a maximum retention number or time period for process instance information. In particular examples, this is implemented as an agent that runs in conjunction with the federation server, or as a thread running in the federation server. This can be something that is configurable depending on the application, perhaps a number of total instances. Instantiation of a new server instance is something that may occur as a separate action—scripting for instance may add another member to the federation, or an admin console may be used for the entire BPM installation. In some examples, the federation server upon recognizing that the threshold is reached raises a flag and/or invokes an API that already exists to add a server instance and associated database.

While aspects described herein are scalable in that the process can continue adding new databases, eventually the index on the federation server may no longer be manageable and/or cloud-based resources to support such an extensive array of active/secondary process manager databases may be too costly. Therefore, some upper limit may be put in place for purging completed process instance information from a secondary process manager database.

Accordingly, facilities described herein enable scaling of storage and management of completed process and task information without affecting client interfaces to access and look at this information. Financial implications for cloud providers, as an example, include the ability to charge for maintaining and storing this historical (completed process instance) information, potentially with a different fee structure than for maintaining and storing active process instance information.

As an enhancement, multiple federation servers may correspond to different federations and/or a BPM server instance may belong to multiple different federations. Different users may use different federations—for example higher-level managers may run queries across a more diverse set of processes, while lower-level manager may run deeper queries in the archives (secondary databases) across a narrower set of processes. Consequently, different federation servers may examine information for different sets of process instances. This can be achieved by building separate indexes in different federation servers, or potentially a common federation server, to effectively partition the search and access of information of the original processes. The clients of a certain constituency could then query a federation/index that includes the BPM server instance(s) of concern.

Figure 3A:
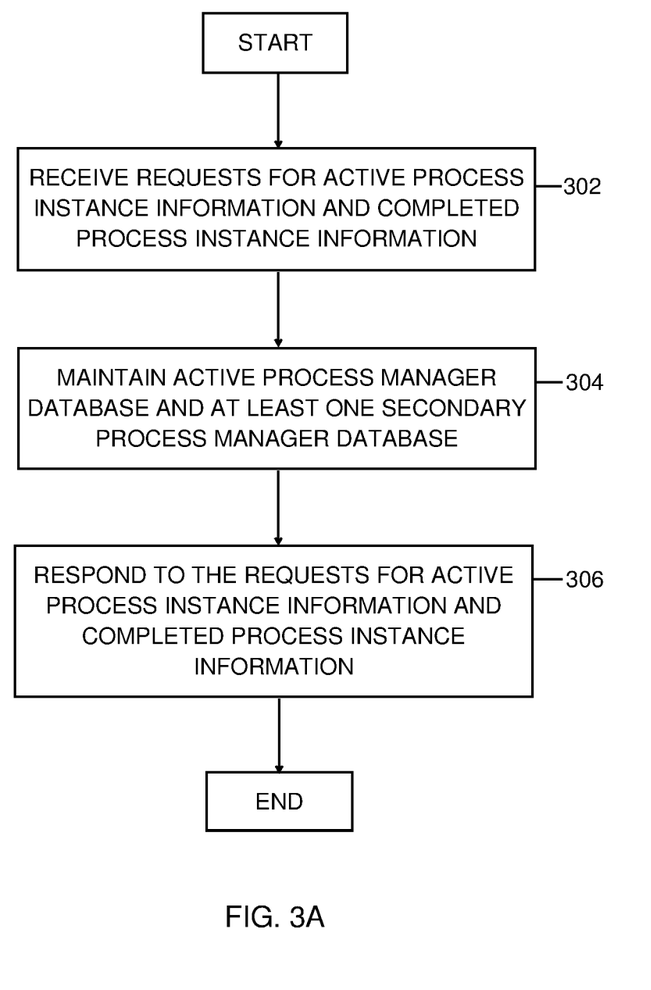
FIGS. 3A-3C depict example processes for providing transparent scalable access to active and completed process and task information, in accordance with aspects described herein.

Aspects described herein provide processes for transparent scalable access to active and completed process and task information in a process management environment. Example such processes are described in conjunction with FIGS. 3A-3C. FIG. 3A depicts one example of a process for providing transparent scalable access to active and completed process and task information, in accordance with aspects described herein. In some examples, the process of FIG. 3A is performed by one or more computer system(s), such as a federation server.

The process of FIG. 3A includes receiving requests for active process instance information and completed process instance information (302). The requests may be received from one or more client systems. The requests could be of varying complexity. For instance, one request may be directed to a specific process instance, and the federation server may reach out to a single database that houses the requested information about the specific process instance. In other examples, the request is a more complex query, such as one that uses a wildcard, in which case queries/requests about potentially many process instances, some of which may have completed and some may be active, can be generated by the federation server. Consequently, the handling and response to this type of request may involve numerous queries to different databases in order to obtain and return all of the information requested by the client request.

The process of FIG. 3A also includes maintaining an active process manager database and at least one secondary process manager database in the process management environment (304). The active process manager database can support (manage, track, execute, etc.) newly created process instances and include information about active process instances. The at least one secondary process manager database may be one or more process manager databases, each of which can include information about respective completed process instances.

FIG. 3A continues by responding to the requests (306). The responding can include accessing appropriate process manager database(s) of the active process manager database and the at least one secondary process manager database to obtain information for responding to a request, and responding to the request with the obtained information. In some examples several such databases are accessed, for instance in the event that a request requests information housed on different databases of the active and secondary databases. In other examples, one such database is accesses—the database with the information concerning the process instance that is the subject of the request.

The maintaining of the active and at least one secondary process manager databases can include creating a new process manager database based on reaching a threshold. For instance, based on meeting the threshold, a flag can be raised, e.g. by the federation server, to initiate creation of a new process manager server instance to be associated with the new process manager database and handle requests for process instance information (about active or completed process instances) directed thereto.

While the threshold can be any desired threshold to add a new database, in some examples, the threshold includes a period of time (such as every 20 days) or completion of a threshold number of process instances supported by the current active process manager.

Figure 3B:
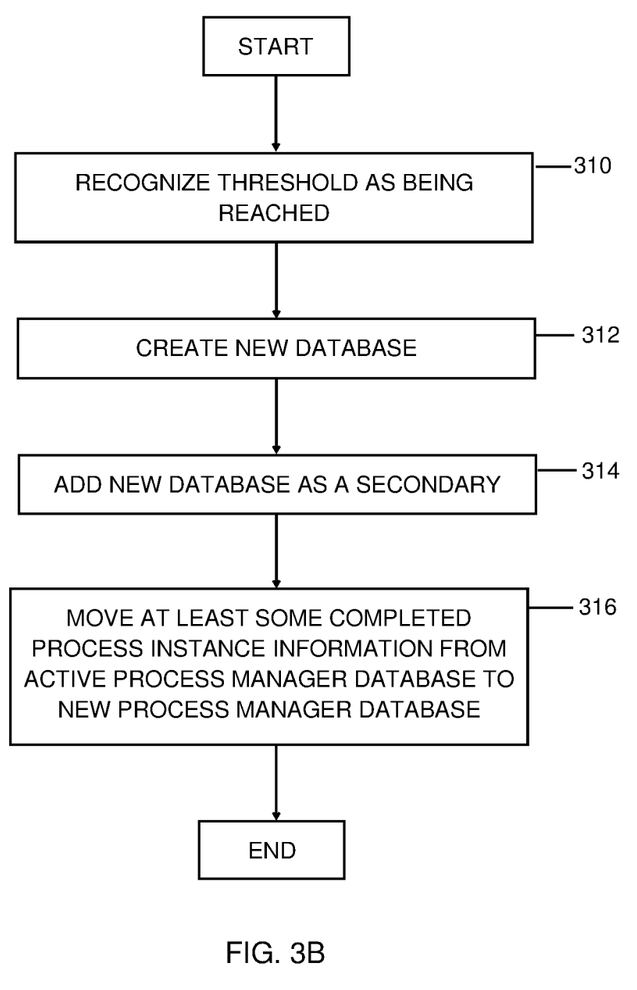

The new process manager database may be added to be a secondary process manager database of the at least one secondary process manager database, or to be the active process manager database. FIG. 3B depicts an example process of maintaining the active and secondary process manager database(s), in which an added process manager database is added as a secondary process manager database. Initially upon recognizing that the threshold has been reached (310), the database to be added is created (if not created already) (312) and added as a secondary process manager database of the at least one secondary process manager database (314). The added database may be the first such secondary process manager database, or may be an additional secondary process manager database. The process continues by moving information about at least some completed process instances out of the active process manager database to the new process manager database (316). This moving removes the at least some completed process instances from a maintenance scope of a process manager server instance that is associated with the active process manager database.

Figure 3C:
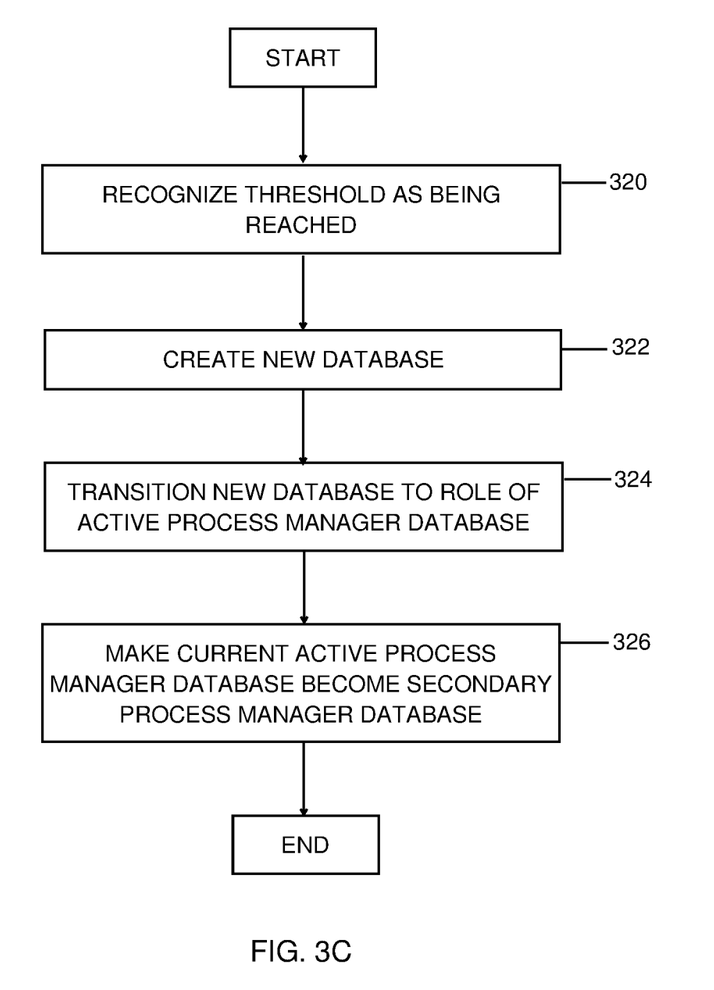

In another approach, the new database is added to assume the role of active process manager database. FIG. 3C depicts an example process of maintaining the active and secondary process manager database(s), in which an added process manager database is added to be the active process manager database. Initially upon recognizing that the threshold has been reached (320), the database to be added is created (if not created already) (322). The new database takes over with a transition of the new database to the role of active process manager database from a current active process manager database (324).

The process makes the current active process manager database become a secondary process manager database of the at least one secondary process manager database (326). Accordingly, the new process manager database (now the active process manager database) supports newly created process instances and the secondary process manager database, formerly the active process manager database, retains and provides information about completed process instances and associated tasks. Additionally, the secondary process manager database, formerly the active process manager database, can continue to support (e.g. execute, track, maintain state, store information about, etc.) at least one active process instance to completion. The at least one process instance may have been instantiated when the secondary process manager database was the active process manager database.

In this manner, information about the at least one active process instance can be sourced from the secondary process manager database even though it is no longer the active process manager database. Accordingly, responding to the requests (FIG. 3A #306) can include a federation layer directing a request for information about a particular active process instance to whichever process manager database of the active process manager database or the secondary process manager database, formerly the active process manager database, supports the particular active process instance.

Though not depicted in FIG. 3A, a process for transparent scalable access to active and completed process and task information can initially provide an application programming interface (API) through which the requests for active process instance information and completed process instance information are received. The API can leverage a federation layer of a federation server, the federation layer accessing the active process instance information and the completed process instance information. In this situation, responding to the requests (FIG. 3A, #306) can additionally include the federation layer directing requests for completed process instance information to one of the at least one secondary process manager databases, and the federation layer directing requests for active process instance information to the active process manager database. As described previously, any such request may come as a direct client query for the completed or active process instance information as the case may be, or the request may be ascertained from a client query, for example one that requests process information for any process instance was executing 24 hours ago. This type of query may capture information about both (currently) active and completed process instances that were running 24 hours ago. In this case, a request for information about each of these is implicitly received from the client request/query for information about recently executing process instances.

Accordingly, a request can include a request for information about at least one active process instance and/or at least one completed process instance. The responding (FIG. 3A, #306) can include accessing a plurality of process manager databases including the active process manager database and one or more secondary process manager database(s) to obtain the information about the at least one active instance and at least one completed instance, and this accessing of the plurality of process manager databases can be transparent to a client from which the request is received. The client may have no knowledge that process instance information is distributed among several databases serving different roles and sourced from those several databases.

Processes described herein may be performed singly or collectively by one or more computer systems, such as computer system(s) described below with reference to FIG. 4. In some embodiments, such a computer system may be or include the primary mobile device, secondary mobile device, and/or a remote cloud server in communication with these devices.

Figure 4:
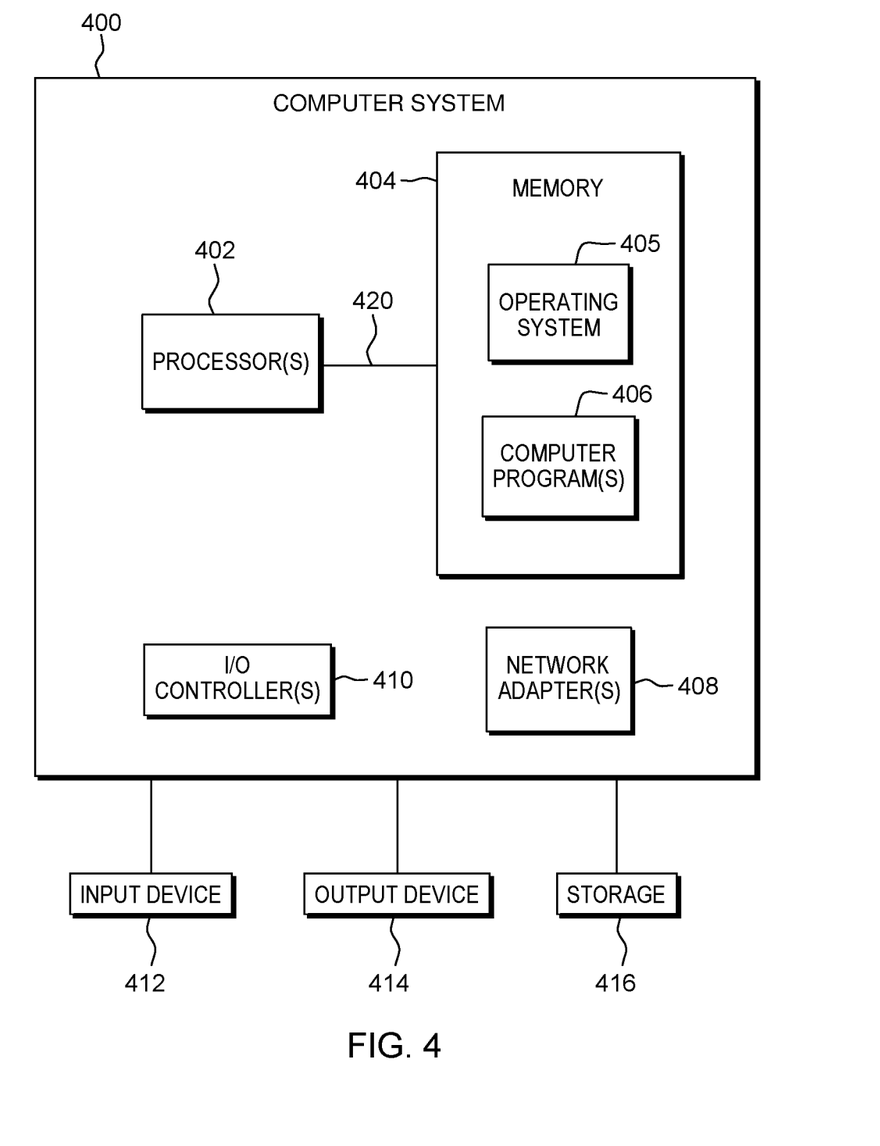
FIG. 4 depicts an example of a computer system to incorporate or use aspects described herein.

FIG. 4 depicts one example of a computer system to incorporate or use aspects described herein. A computer system may also be referred to herein as a data processing device/system or computing device/system, or simply a computer. Computer system 400 may be based on one or more of various system architectures such as those offered by International Business Machines Corporation (Armonk, N.Y., USA) or Intel Corporation (Santa Clara, Calif., USA), as examples.

Computer system 400 is suitable for storing and/or executing program code and includes at least one processor 402 coupled directly or indirectly to memory 404 through, e.g., a system bus 420. In operation, processor(s) 402 obtain from memory 404 one or more instructions for execution by the processors. Memory 404 may include local memory employed during actual execution of the program code, bulk storage, and cache memories which provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and one or more computer programs 406, for instance programs to perform aspects described herein.

Input/Output (I/O) devices 412, 414 (including but not limited to displays, microphones, speakers, accelerometers, gyroscopes, magnetometers, light sensors, proximity sensors, GPS devices, cameras, etc.) may be coupled to the system either directly or through I/O controllers 410.

Network adapter(s) 408 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 408 used in computer systems.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402 in a manner known in the art.

The computer system 400 may include fewer components than illustrated, additional components not illustrated herein, or some combination of the components illustrated and additional components. Computer system 400 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 5:
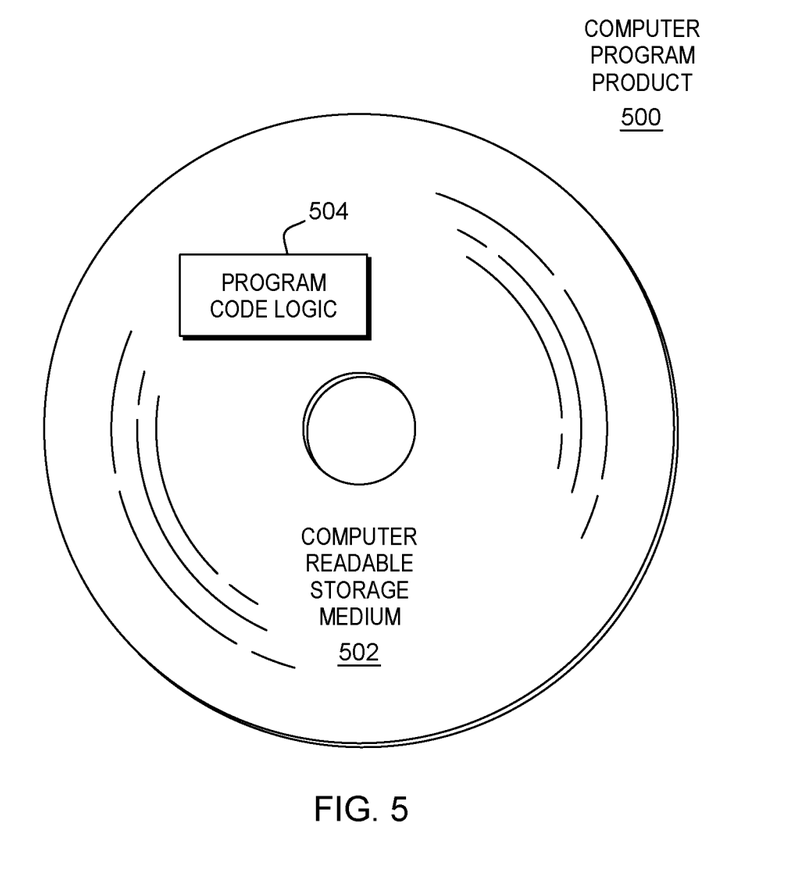
FIG. 5 depicts one embodiment of a computer program product.

Referring to FIG. 5, in one example, a computer program product 500 includes, for instance, one or more computer readable storage media 502 to store computer readable program code means, logic and/or instructions 504 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving a request for information about at least one active process instance and information about at least one completed process instance;
maintaining, in a process management environment, (i) an active process manager database that stores information about active process instances and (ii) at least one secondary process manager database that stores the information about the at least one completed process instance, the active process manager database supporting newly created process instances, in which information about active process instances, including the newly created process instances, is stored in the active process manager database while the active process instances remain active, and the at least one secondary process manager database including information about completed process instances that are no longer active;

providing an application programming interface (API) through which requests for active process instance information and completed process instance information are received, the API leveraging a federation layer that accesses the active process instance information and the completed process instance information; and responding to the request, the responding comprising accessing at least one appropriate process manager database of the active process manager database and the at least one secondary process manager database to obtain information for responding to the request, the obtained information for responding to the request comprising the information about the at least one active process instance and the information about the at least one completed process instance, and responding to the request by providing, to a sender of the request, the obtained information, wherein responding to the requests further comprises: the federation layer directing requests for completed process instance information to one of the at least one secondary process manager database; and the federation layer directing requests for active process instance information to the active process manager database;

wherein the maintaining comprises creating a new process manager database based on reaching a threshold, the new process manager database to be the active process manager database, wherein the new process manager database takes over a role of active process manager database from a current active process manager database, the current active process manager database becoming a secondary process manager database of the at least one secondary process manager database, wherein the new process manager database supports newly created process instances and the secondary process manager database, formerly the active process manager database, retains and provides information about completed process instances and associated tasks, and wherein the secondary process manager database, formerly the active process manager database, continues to support at least one active process instance to completion, the at least one process instance instantiated when the secondary process manager database was the active process manager database.

2. The method of claim 1, wherein the threshold comprises a period of time or completion of a threshold number of process instances supported by the current active process manager.

3. The method of claim 1, wherein responding to the request comprises the federation layer directing a request for information about a particular active process instance to whichever process manager database of the active process manager database or the secondary process manager database, formerly the active process manager database, supports the particular active process instance.

4. The method of claim 1, wherein the maintaining further comprises raising a flag based on meeting the threshold, the flag to initiate creation of a new process manager server instance to be associated with the new process manager database and handle requests directed thereto.

5. The method of claim 1, wherein the responding comprises accessing a plurality of process manager databases including the active process manager database and one or more secondary process manager databases to obtain the information about the at least one active instance and the information about the at least one completed instance, and wherein the accessing the plurality of process manager databases is transparent to a client from which the request is received.

6. A computer program product comprising:
a computer readable storage medium readable by a processor and storing instructions for execution by the processor for performing a method comprising:
receiving a request for information about at least one active process instance and information about at least one completed process instance;

maintaining, in a process management environment, (i) an active process manager database that stores information about active process instances and (ii) at least one secondary process manager database that stores the information about the at least one completed process instance, the active process manager database supporting newly created process instances, in which information about active process instances, including the newly created process instances, is stored in the active process manager database while the active process instances remain active, and the at least one secondary process manager database including information about completed process instances that are no longer active;

providing an application programming interface (API) through which requests for active process instance information and completed process interface information are received, the API leveraging a federation layer that accesses the active process instance information and the completed process instance information; and responding to the request, the responding comprising accessing at least one appropriate process manager database of the active process manager database and the at least one secondary process manager database to obtain information for responding to the request, the obtained information for responding to the request comprising the information about the at least one active process instance and the information about the at least one completed process instance, and responding to the request by providing, to a sender of the request, the obtained information, wherein responding to the requests further comprises: the federation layer directing requests for completed process instance information to one of the at least one secondary process manager database; and the federation layer directing requests for active process instance information to the active process manager database;

wherein the maintaining comprises creating a new process manager database based on reaching a threshold, the new process manager database to be the active process manager database, wherein the new process manager database takes over a role of active process manager database from a current active process manager database, the current active process manager database becoming a secondary process manager database of the at least one secondary process manager database, wherein the new process manager database supports newly created process instances and the secondary process manager database, formerly the active process manager database, retains and provides information about completed process instances associated tasks, and wherein the secondary process manager database, formerly the active process manager database, continues to support at least one active process instance to completion, the at least one process instance instantiated when the secondary process manager database was the active process manager database.

7. The computer program product of claim 6, wherein the responding comprises accessing a plurality of process manager databases including the active process manager database and one or more secondary process manager databases to obtain the information about the at least one active instance and information about the at least one completed instance, and wherein the accessing the plurality of process manager databases is transparent to a client from which the request is received.

8. A computer system comprising:
a memory; and
a processor in communication with the memory, wherein the computer system is configured to perform a method, the method comprising:
receiving requests for active process instance information and completed process instance information;
maintaining an active process manager database and at least one secondary process manager database in a process management environment, the active process manager database supporting newly created process instances and including information about active process instances, and the at least one secondary process manager database including information about completed process instances;
providing an application programming interface (API) through which requests for active process instance information and completed process interface information are received, the API leveraging a federation layer that accesses the active process instance information and the completed process instance information; and
responding to the requests, the responding comprising accessing an appropriate process manager database of the active process manager database and the at least one secondary process manager database to obtain information for responding to a request, and responding to the request with the obtained information, wherein responding to the requests further comprises: the federation layer directing requests for completed process instance information to one of the at least on secondary process manager database; and the federation layer directing requests for active process instance information to the active process manager database;
wherein the maintaining comprises creating a new process manager database based on reaching a threshold, the new process manager database to be the active process manager database, wherein the new process manager database takes over a role of active process manager database from a current active process manager database, the current active process manager database becoming a secondary process manager database of the at least one secondary process manager database, wherein the new process manager database supports newly created process instances and the secondary process manager database, formerly the active process manager database, retains and provides information about completed process instances associated tasks, and wherein the secondary process manager database, formerly the active process manager database, continues to support at least one active process instance to completion, the at least one process instance instantiated when the secondary process manager database was the active process manager database.

* * * * *